(12) United States Patent
Zhang

(10) Patent No.: US 12,160,704 B2
(45) Date of Patent: Dec. 3, 2024

(54) VIBRATION TRANSDUCER

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 219 days.

(21) Appl. No.: 18/079,004

(22) Filed: Dec. 12, 2022

(65) Prior Publication Data

US 2024/0056725 A1   Feb. 15, 2024

Related U.S. Application Data

(63) Continuation of application No. PCT/CN2022/119759, filed on Sep. 20, 2022.

(30) Foreign Application Priority Data

Aug. 11, 2022   (CN) .......................... 202222116541.3

(51) Int. Cl.
 *H04R 1/28* (2006.01)
 *H04R 19/04* (2006.01)

(52) U.S. Cl.
 CPC .......... *H04R 1/2803* (2013.01); *H04R 19/04* (2013.01); *H04R 2201/003* (2013.01); *H04R 2400/11* (2013.01)

(58) Field of Classification Search
 CPC ..................... H04R 1/2803; H04R 2201/003; H04R 19/04; H04R 31/00; H04R 17/02; H04R 3/005; H04R 7/04; H04R 1/04; H04R 1/406; H04R 2400/11
 USPC .............. 381/92, 87, 91, 423, 424, 398, 345
 See application file for complete search history.

(56) References Cited

U.S. PATENT DOCUMENTS

| | | | | |
|---|---|---|---|---|
| 6,721,431 B1 * | 4/2004 | Johnson | ................. | H04R 1/326 381/186 |
| 2009/0190775 A1 * | 7/2009 | Reining | ................. | H04R 1/406 381/92 |

* cited by examiner

*Primary Examiner* — Norman Yu
(74) *Attorney, Agent, or Firm* — W&G Law Group

(57) ABSTRACT

The present disclosure discloses a vibration transducer including a circuit board, a vibration detection assembly and a signal detection assembly arranged on two opposite sides of the circuit board; the vibration detection assembly includes a first vibration detection unit, a second vibration detection unit, and a third vibration detection unit; the signal detection assembly includes a first MEMS microphone, a second MEMS microphone, and a third MEMS microphone. A first membrane of the first vibration detection unit, a second membrane of the second vibration detection unit, and the third membrane of the third vibration detection unit vibrate along three orthogonal directions. The vibration transducer has higher sensitivity and bigger bandwidth.

10 Claims, 6 Drawing Sheets

100

A-A

100

VIBRATION TRANSDUCER

FIELD OF THE PRESENT DISCLOSURE

The present disclosure relates to transducer technologies, especially relates to a vibration transducer converting vibration signal to electrical signal.

DESCRIPTION OF RELATED ART

A vibration transducer configured to convert vibration signal to electrical signal has been widely applied in vehicle technologies. The vibration signal of the vehicle body detected up by the vibration transducer is transmitted to a speaker after inversed phase process, thus offsetting the noise inside the vehicle and effectively improving driving experience.

In related art, an accelerometer is provided to detect vibration signal. Although the accelerometer can accurately measure the stable acceleration signal, active noise reduction process only focus on the changeable signal and ignore the absolute value of the acceleration. At the same time, the accelerometer has slow response, limited bandwidth, and high cost. Besides the accelerometer, a vibration detection structure is provided to convert the vibration signal into changeable pressure detected by a MEMS microphone. However, a common vibration detection structure can only detect the vibration signal along one direction, which cannot be used to active noise reduction process. Thus, the vibration detection structure in related art has low sensitivity and smaller bandwidth.

Therefore, it is necessary to provide an improved vibration transducer to overcome the problems mentioned above.

SUMMARY OF THE INVENTION

One object of the present disclosure is to provide a vibration transducer with higher sensitivity and bigger bandwidth.

The vibration transducer includes a circuit board; a vibration detection assembly arranged on one side of the circuit board, comprising a first vibration cavity, a second vibration cavity, and a third vibration cavity spaced from each other; and a signal detection assembly arranged on the other side of the circuit board, including: a first MEMS microphone corresponding to the first vibration cavity; a second MEMS microphone corresponding to the second vibration cavity; a third MEMS microphone corresponding to the third vibration cavity; wherein the vibration detection assembly further includes a first vibration detection unit, a second vibration detection unit, and a third vibration unit received in the first vibration cavity, the second vibration cavity, and the third vibration cavity, respectively; a first through hole configured to connecting the first vibration cavity with the first MEMS microphone is provided on the circuit board; a second through hole configured to connecting the second vibration cavity with the second MEMS microphone is provided on the circuit board; a third through hole configured to connecting the third vibration cavity with the third MEMS microphone is provided on the circuit board; the first vibration detection unit comprises a first membrane configured to vibrate along a first axis in the first vibration cavity; the second vibration detection unit comprises a second membrane configured to vibrate along a second axis in the second vibration cavity; the third vibration detection unit comprises a third membrane configured to vibrate along a third axis in the third vibration cavity; the first axis, the second axis, and the third axis are perpendicular with each other.

As an improvement, the first vibration detection unit further includes a first vibration plate fixed to the first membrane; the first vibration plate includes a fixed end fixed to the circuit board, and a cantilever extending into the first vibration cavity from the fixed end.

As an improvement, the first vibration detection unit further includes a first mass fixed to a side of the first vibration plate away from the first membrane.

As an improvement, the vibration detection assembly further includes a frame mounted on the circuit board, and a upper cover fixed on the frame; the first vibration cavity, the second vibration cavity, and the third vibration cavity are all enclosed by the upper cover and the frame.

As an improvement, the first membrane is fixed to the frame for dividing the first vibration cavity into a first upper vibration cavity and a first bottom vibration cavity; the first through hole comprises a first upper connection hole configured to connect the first upper vibration cavity with the first MEMS microphone, and a first bottom connection hole configured to connect the first bottom vibration cavity with the first MEMS microphone.

As an improvement, the first MEMS microphone includes a MEMS chip fixed to the circuit board and having a back cavity, and a shell fixed to the circuit board and covering the MEMS chip; the MEMS chip, the circuit board, and the shell enclose an inner cavity; the first upper connection hole connects the first upper vibration cavity with the inner cavity; the first bottom connection hole connects the first bottom vibration cavity with the back cavity.

As an improvement, the first though hole penetrates the circuit board along a first direction; the frame includes a first end fixed to the circuit board, and a second end away from the first end along the first direction; a section area of the first end along a direction perpendicular with the first direction decreases from the first end towards the second end.

As an improvement, a first penetrating hole is provided on the fixed end penetrating thereon along the first direction; the first penetrating hole is configured to connect the first upper vibration cavity with the first upper connection hole and the inner cavity.

As an improvement, a second penetrating hole is provided on the frame penetrating thereon along the first direction; the second penetrating hole is configured to connect the first bottom vibration cavity with the first bottom connection hole and the back cavity.

As an improvement, the upper cover includes an upper fixation portion fixed to the second end, a bottom fixation portion fixed to the circuit board, and a connection portion connecting the upper fixation portion and the bottom fixation portion; the connection portion is spaced apart from the first membrane along the first axis

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
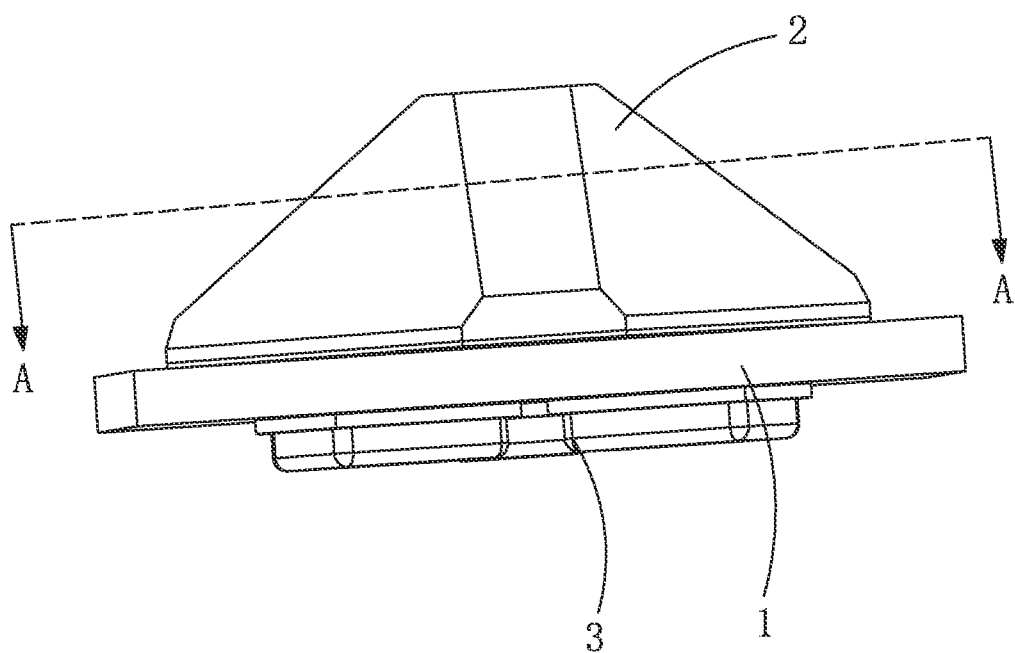
FIG. 1 is an isometric view of a vibration transducer in accordance with an exemplary embodiment of the present disclosure.
Figure 2:
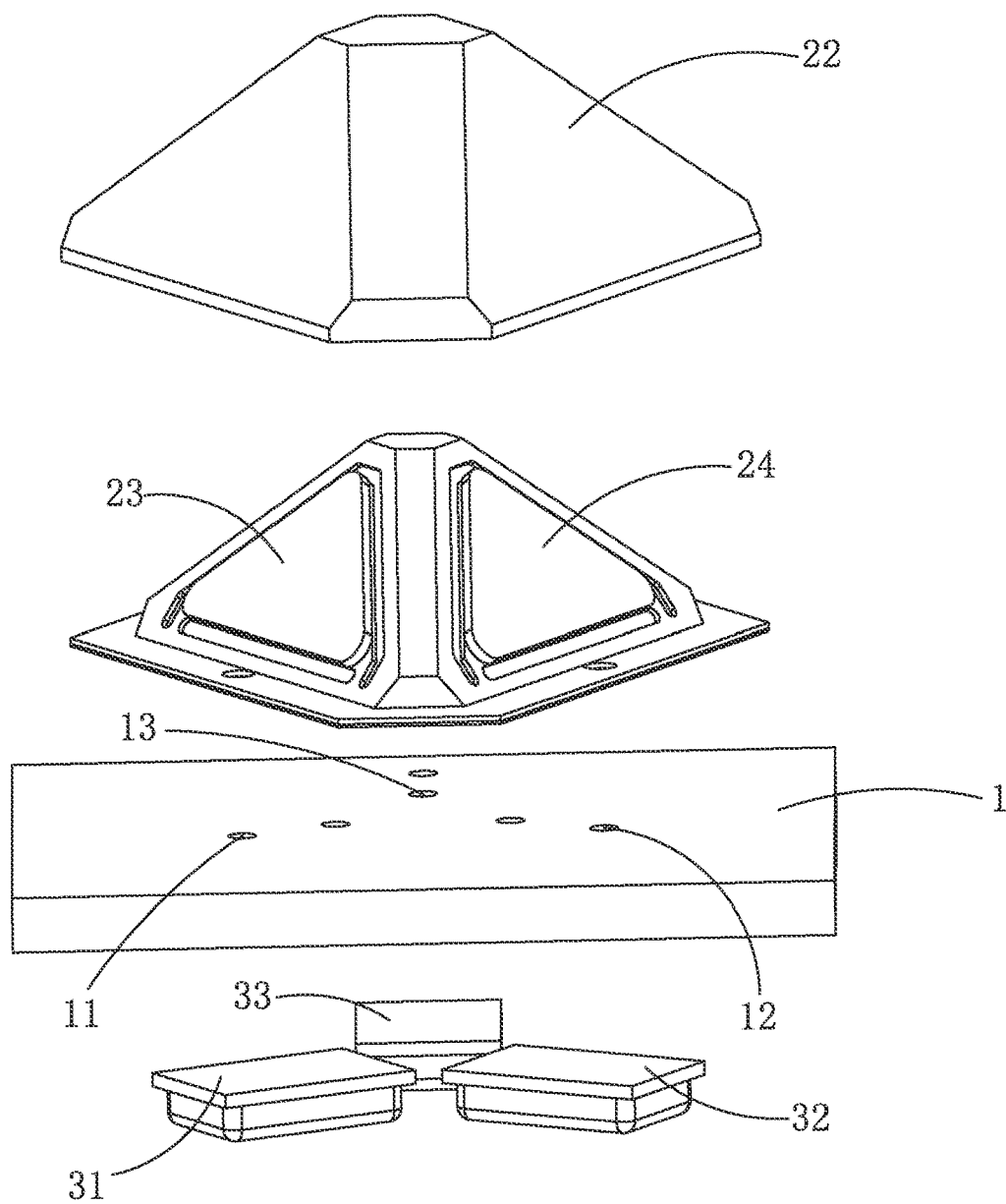
FIG. 2 is an exploded view of the vibration transducer in FIG. 1.
Figure 3:
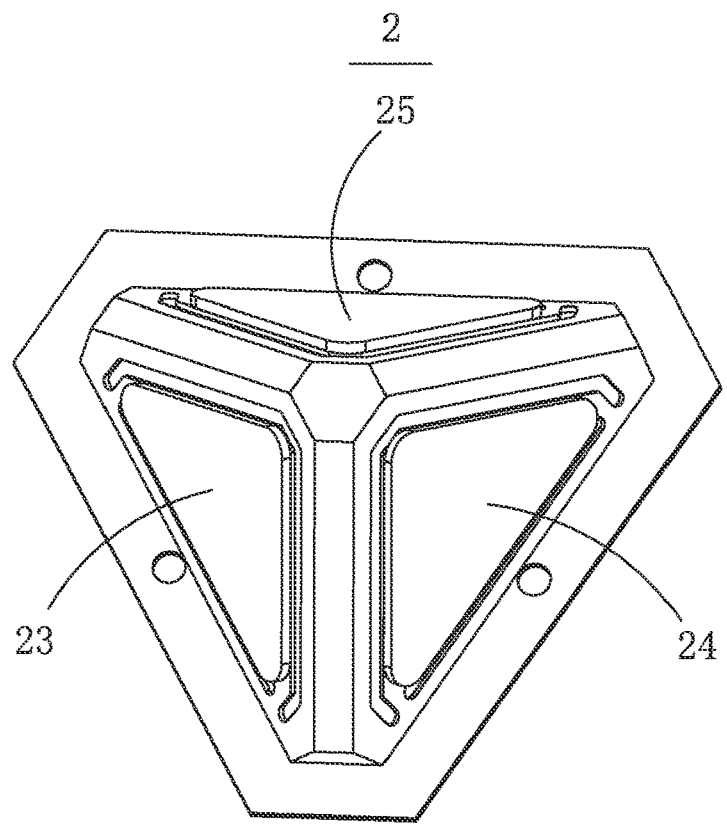
FIG. 3 is an isometric view of a vibration detection assembly of the vibration transducer in FIG. 1.
Figure 4:
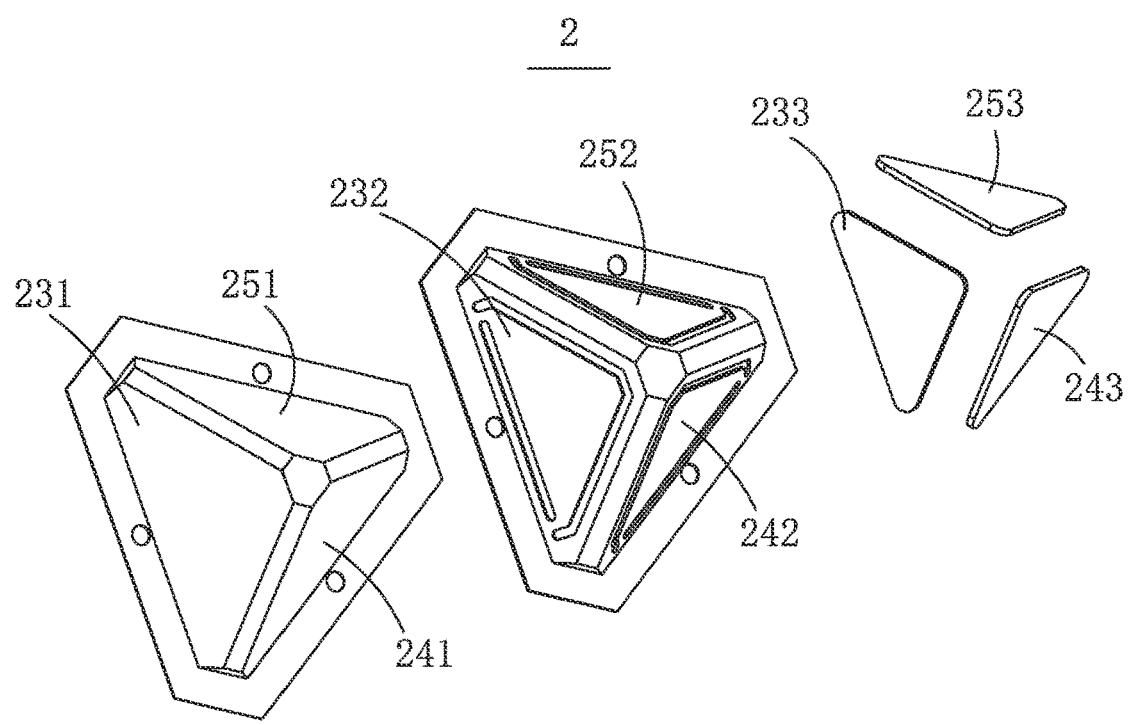
FIG. 4 is an exploded view of the vibration detection assembly in FIG. 3.
Figure 5:
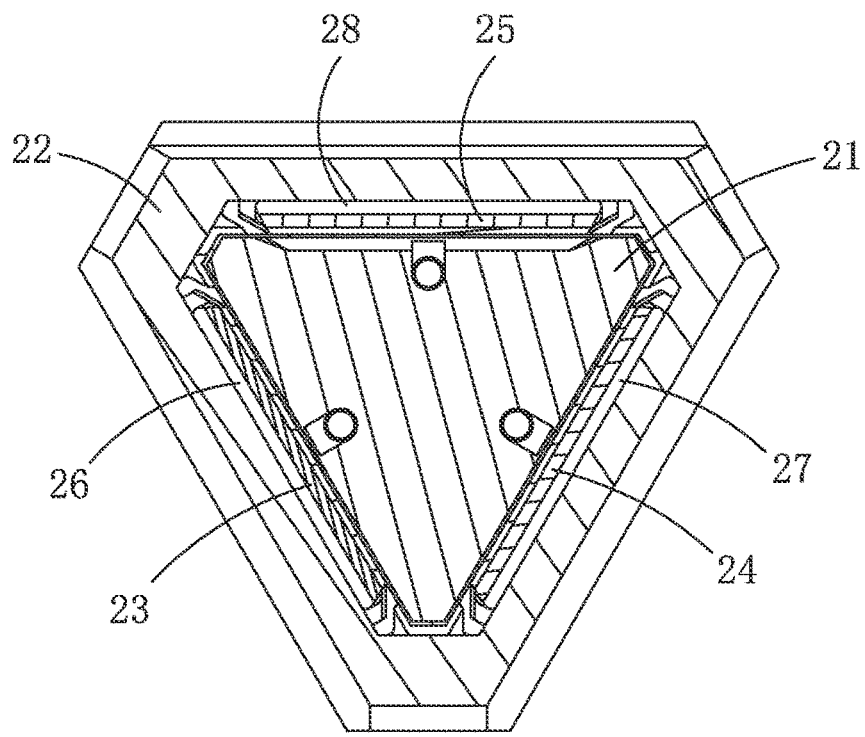
FIG. 5 is a cross-sectional view of the vibration transducer taken along line A-A in FIG. 1.
Figure 6:
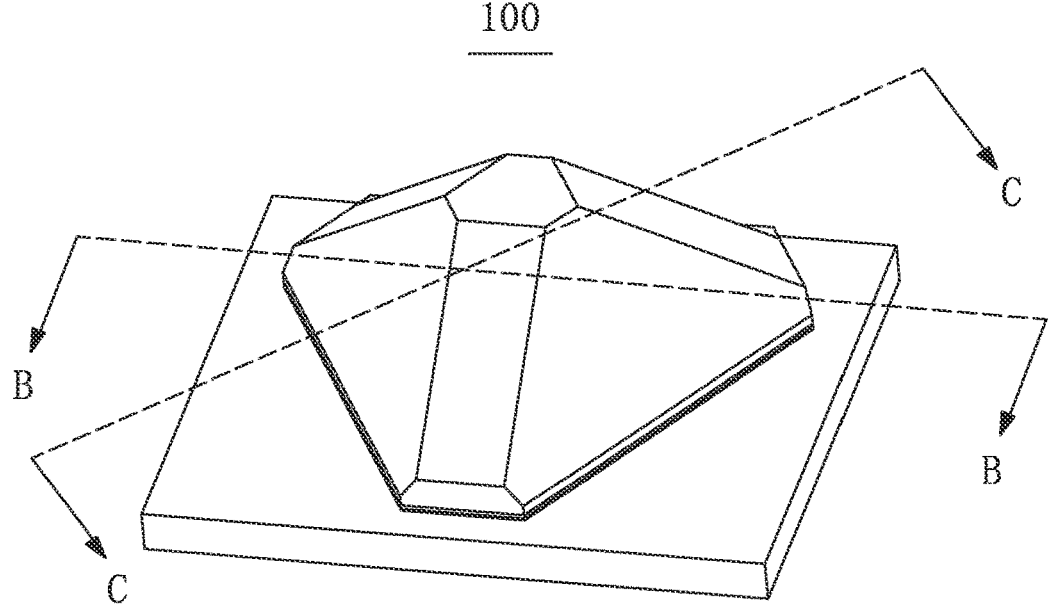
FIG. 6 is an isometric view of the vibration transducer in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-9 together, a vibration transducer 100 provided by an exemplary embodiment of the present disclosure includes a circuit board 1, a vibration detection assembly 2 arranged on one side of the circuit board 1, and a signal detection assembly 3 arranged on the other side of the circuit board 1.

The vibration detection assembly 2 includes a frame 21 mounted on the circuit board 1, a upper cover 22 fixed on the frame 21, and a first vibration detection unit 23, a second vibration detection unit 24, and a third vibration unit 25. The first vibration detection unit 23, the second vibration detection unit 24, and the third vibration unit 25 are configured to detect vibration signal. Specifically, the frame 21 and the upper cover 22 encloses a first vibration cavity 26, a second vibration cavity 27, and a third vibration cavity 28 spaced from each other. The first vibration detection unit 23, the second vibration detection unit 24, and the third vibration unit 25 are received in the first vibration cavity 27, the second vibration cavity 28, and the third vibration cavity 29, respectively.

The signal detection assembly 3 includes a first MEMS microphone 31 corresponding to the first vibration cavity 26, a second MEMS microphone 32 corresponding to the second vibration cavity 27, and a third MEMS microphone 33 corresponding to the third vibration cavity 28. It can be understood that the first MEMS microphone 31, the second MEMS microphone 32, and the third MEMS microphone 33 has the same structure. Also, they could have different structure only if they can detect vibration signal. In one embodiment, the first MEMS microphone 31, the second MEMS microphone 32, and the third MEMS microphone 33 has the same structure. Therefore, structure of the first MEMS microphone 31 is described below.

The first MEMS microphone 31 includes a MEMS chip 312 fixed to the circuit board 1 and having a back cavity 311, and a shell 313 fixed to the circuit board 1 and covering the MEMS chip 312; the MEMS chip 312, the circuit board 1, and the shell 313 enclose an inner cavity 314. The MEMS chip 312 is a capacitive MEMS microphone. It can be understood that a sound hole is provided on the first MEMS microphone 31 corresponding to the back cavity 311 and the inner cavity 314. The sound hole is configured to transmit the pressure signal of the vibration detection assembly 2 to the signal detection assembly 3.

In order to transmit the vibration signal detected by the vibration detection assembly 2 to the signal detection assembly 3, a first through hole 11 configured to connecting the first vibration cavity 26 with the first MEMS microphone 31 is provided on the circuit board 1; a second through hole 12 configured to connecting the second vibration cavity 27 with the second MEMS microphone 32 is provided on the circuit board 1; a third through hole 13 configured to connecting the third vibration cavity 28 with the third MEMS microphone 33 is provided on the circuit board 1. The first through hole 11, the second through hole 12, the third through hole 13 penetrates the circuit board 1 along a first direction D.

In addition, the first vibration detection unit 23 includes a first membrane 231 configured to vibrate along a first axis X in the first vibration cavity 26, and a first vibration plate 232 fixed to the first membrane 231; the second vibration detection unit 24 includes a second membrane 241 configured to vibrate along a second axis Y in the second vibration cavity 27, and a second vibration plate 242 fixed to the second membrane 241; the third vibration detection unit 25 includes a third membrane 251 configured to vibrate along a third axis Z in the third vibration cavity 28, and a third vibration plate 252 fixed to the third membrane 251. The first axis X, the second axis Y, and the third axis Z are perpendicular with each other. In other words, the first membrane 231, the second membrane 241, and the third membrane 251 vibrate along three orthogonal directions, respectively, so as to detect vibration signals of the three directions and then convert into pressure signal picked up by the corresponding MEMS microphone. In one embodiment, the first vibration detection unit 23, the second vibration detection unit 24, and the third vibration unit 25 have a same structure. In order to illustrate working mechanism of the vibration transducer 100 briefly, the first vibration detection unit 23 and the first MEMS microphone 31 are described.

Figure 7:
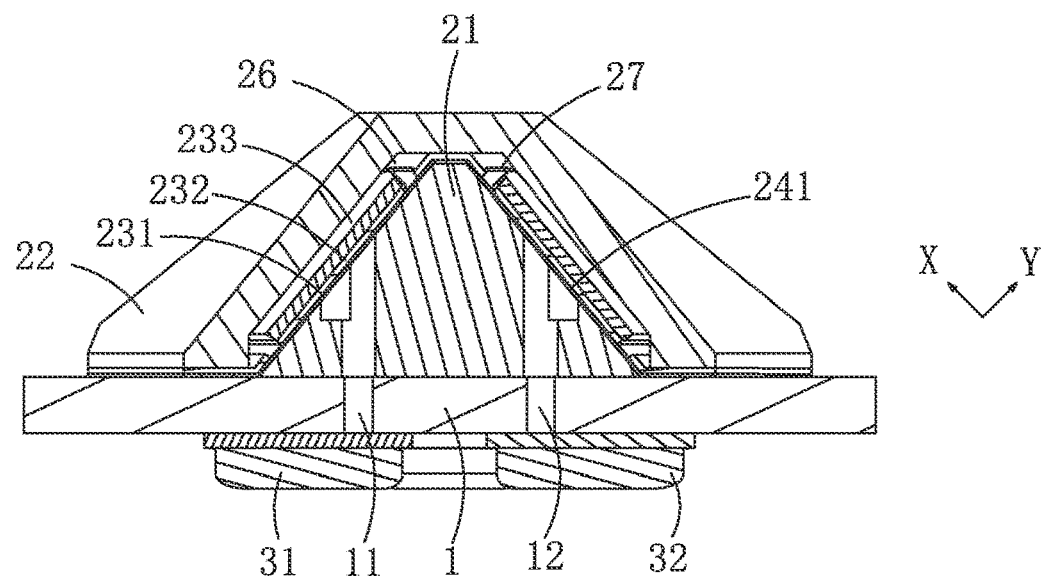
FIG. 7 is a cross-sectional view of the vibration transducer taken along line B-B in FIG. 6.
Figure 8:
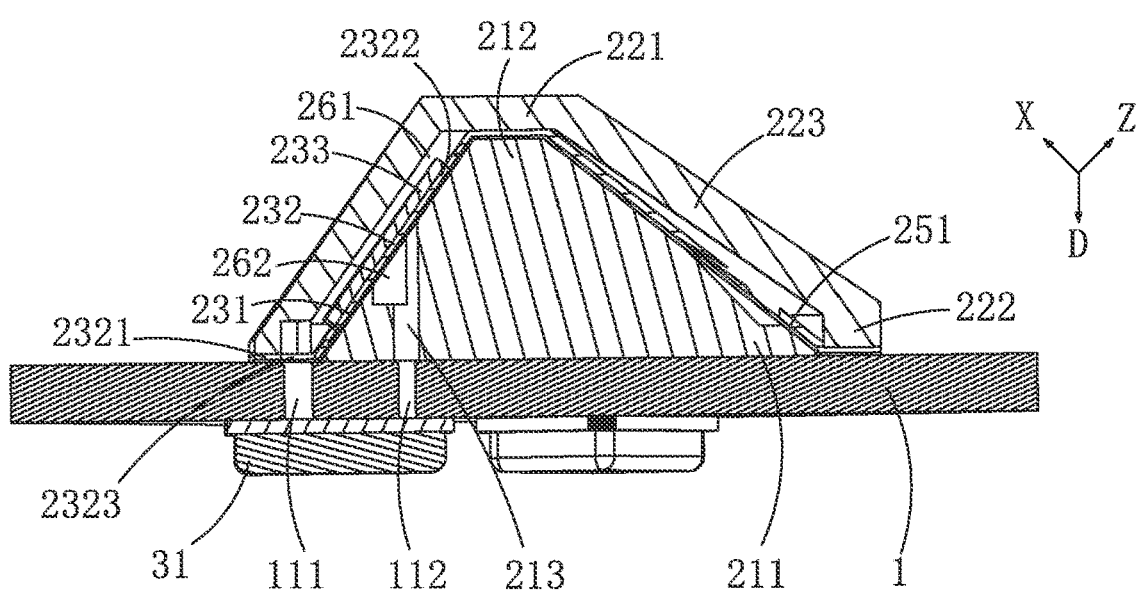
FIG. 8 is a cross-sectional view of the vibration transducer taken along line C-C in FIG. 6.
Figure 9:
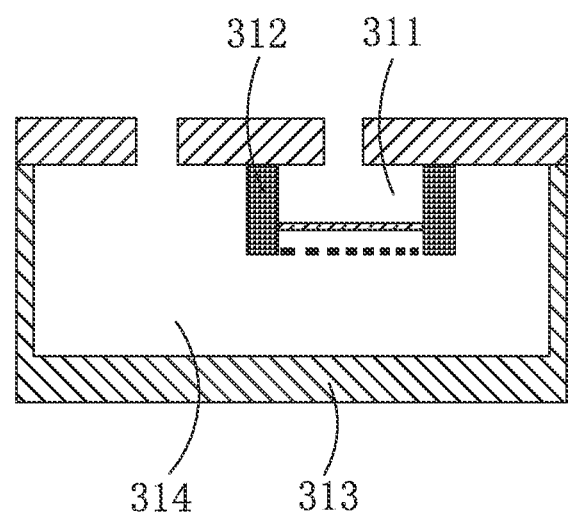
FIG. 9 is a sketch map of a first MEMS microphone of the vibration transducer in FIG. 1

Please refer to FIGS. 7-9, the first membrane 231 is fixed to the frame 21 for dividing the first vibration cavity 26 into a first upper vibration cavity 261 and a first bottom vibration cavity 262; the first through hole 11 includes a first upper connection hole 111 configured to connect the first upper vibration cavity 261 with inner cavity 314 of the first MEMS microphone 31, and a first bottom connection hole 112 configured to connect the first bottom vibration cavity 262 with the back cavity 311 of the first MEMS microphone 31. Furthermore, the first vibration plate 232 includes a fixed end 2321 fixed to the circuit board 1, and a cantilever 2322 extending into the first vibration cavity 26 from the fixed end 2321. A first penetrating hole 2323 is provided on the fixed end 2321 penetrating thereon along the first direction D; the first penetrating hole 2323 is configured to connect first upper vibration cavity 261 with the first upper connection hole 111 and the inner cavity 314. When the first vibration detection unit 23 vibrates after detecting the noise outside, the first membrane 231 vibrates along the first axis X to drive the cantilever 2322 vibrate for bringing periodic deformation of the first vibration plate 232. Thus, the pressure of the first upper vibration cavity 261 increases so that positive pressure is transmitted to the inner cavity 314 of the first MEMS microphone 31 through the first penetrating hole 2323 and the first upper connection hole 111. At the same time, the pressure of the first bottom vibration cavity 262 reduces so that negative pressure is transmitted to an upper surface of the MEMS chip 312 through the first bottom connection hole 112. And then, the pressure signal is converted into electrical signal by the MEMS chip 312. Since an area of the first membrane 231 is much larger than an area of an inner membrane of the MEMS chip 312, the first membrane 231 with a small amplitude (typical amplitude 0.00002 nm-0.2 nm) can drive the MEMS chip 312. It can be understood that the working mechanism of the second vibration detection unit 24, and the third vibration unit 25 is same with that of the first vibration detection unit 23. The first membrane 231, the second membrane 241, and the third membrane 251 vibrate along the first axis X, the second axis Y, and the third axis Z, respectively. In this manner, the first vibration detection unit 23, the second vibration detection unit 24, and the third vibration unit 25 can detect vibration signal of three orthogonal directions, thus effectively improving sensitivity and bandwidth of the vibration transducer 100. Furthermore, when the vibration transducer 100 is used in vehicle, the vibration transducer 100 can not only realize PDM output of vibration signal of three axis with low cost, but also realize noise reduction effectively by compliant with externally audio processing chip.

Furthermore, the frame 21 includes a first end 211 fixed to the circuit board 1, and a second end 212 away from the first end 211 along the first direction D; a section area of the first end 211 along a direction perpendicular with the first direction D decreases from the first end 211 towards the second end 212.

Moreover, a second penetrating hole 213 is provided on the frame 21 penetrating thereon along the first direction D; the second penetrating hole 213 is configured to connect the first bottom vibration cavity 262 with first bottom connection hole 112 and the back cavity 311. In this manner, the pressure of the first is transmitted to the MEMS chip 312 through the second penetrating hole 213 and the first bottom connection hole 112 successively.

The upper cover 22 includes an upper fixation portion 221 fixed to the second end 212, a bottom fixation portion 222 fixed to the circuit board 1, and a connection portion 223 connecting the upper fixation portion 221 and the bottom fixation portion 222. It can be seen that the connection portion 223 is spaced apart from the third membrane 251 along the third axis Z. It can be understood that the connection portion 223 is spaced apart from the first membrane 231 along the first axis X and the connection portion 223 is spaced apart from the second membrane 241 along the second axis Y. The fixed end 2321 of the first vibration plate 232 is sandwiched between the circuit board 1 and the bottom fixation portion 222. In order to improve the sensitivity of the vibration transducer 100, the first vibration detection unit 23 further includes a first mass 233 fixed to a side of the first vibration plate 232 away from the first membrane 231.

It should be explained that the working mechanism between the second vibration detection unit 24 and the second MEMS microphone 32, the third vibration detection unit 25 and the third MEMS microphone 33 is same with the first vibration detection unit 23 and the first MEMS microphone 31.

Compared with the related art, the vibration transducer of the present disclosure includes a circuit board, a vibration detection assembly and a signal detection assembly arranged on two opposite sides of the circuit board; the vibration detection assembly includes a first vibration detection unit, a second vibration detection unit, and a third vibration unit received in the first vibration cavity, the second vibration cavity, and the third vibration cavity, respectively; the signal detection assembly includes a first MEMS microphone corresponding to the first vibration cavity, a second MEMS microphone corresponding to the second vibration cavity, and a third MEMS microphone corresponding to the third vibration cavity; a first through hole configured to connecting the first vibration cavity with the first MEMS microphone, a second through hole configured to connecting the second vibration cavity with the second MEMS microphone, a third through hole configured to connecting the third vibration cavity with the third MEMS microphone are provided on the circuit board; the first vibration detection unit includes a first membrane vibrating along a first axis X; the second vibration detection unit includes a second membrane vibrating along a second axis Y; the third vibration detection unit includes a third membrane vibrating along a third axis Z. The first axis X, the second axis Y, and the third axis Z are perpendicular with each other. The vibration transducer can detect vibration signal of three orthogonal directions, thus effectively improving sensitivity and bandwidth of the vibration transducer.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A vibration transducer comprising:
a circuit board;
a vibration detection assembly arranged on one side of the circuit board, comprising a first vibration cavity, a second vibration cavity, and a third vibration cavity spaced from each other; and
a signal detection assembly arranged on the other side of the circuit board, comprising:
a first MEMS microphone corresponding to the first vibration cavity;
a second MEMS microphone corresponding to the second vibration cavity;
a third MEMS microphone corresponding to the third vibration cavity;
wherein the vibration detection assembly further comprises a first vibration detection unit, a second vibration detection unit, and a third vibration unit received in the first vibration cavity, the second vibration cavity, and the third vibration cavity, respectively;
a first through hole configured to connecting the first vibration cavity with the first MEMS microphone is provided on the circuit board; a second through hole configured to connecting the second vibration cavity with the second MEMS microphone is provided on the circuit board; a third through hole configured to connecting the third vibration cavity with the third MEMS microphone is provided on the circuit board;
the first vibration detection unit comprises a first membrane configured to vibrate along a first axis in the first vibration cavity; the second vibration detection unit comprises a second membrane configured to vibrate along a second axis in the second vibration cavity; the third vibration detection unit comprises a third membrane configured to vibrate along a third axis in the third vibration cavity;

the first axis, the second axis, and the third axis are perpendicular with each other.

2. The vibration transducer as described in claim 1, wherein the first vibration detection unit further comprises a first vibration plate fixed to the first membrane; the first vibration plate comprises a fixed end fixed to the circuit board, and a cantilever extending into the first vibration cavity from the fixed end.

3. The vibration transducer as described in claim 2, wherein the first vibration detection unit further comprises a first mass fixed to a side of the first vibration plate away from the first membrane.

4. The vibration transducer as described in claim 3, wherein the vibration detection assembly further comprises a frame mounted on the circuit board, and a upper cover fixed on the frame; the first vibration cavity, the second vibration cavity, and the third vibration cavity are all enclosed by the upper cover and the frame.

5. The vibration transducer as described in claim 4, wherein the first membrane is fixed to the frame for dividing the first vibration cavity into a first upper vibration cavity and a first bottom vibration cavity; the first through hole comprises a first upper connection hole configured to connect the first upper vibration cavity with the first MEMS microphone, and a first bottom connection hole configured to connect the first bottom vibration cavity with the first MEMS microphone.

6. The vibration transducer as described in claim 5, wherein the first MEMS microphone comprises a MEMS chip fixed to the circuit board and having a back cavity, and a shell fixed to the circuit board and covering the MEMS chip; the MEMS chip, the circuit board, and the shell enclose an inner cavity; the first upper connection hole connects the first upper vibration cavity with the inner cavity; the first bottom connection hole connects the first bottom vibration cavity with the back cavity.

7. The vibration transducer as described in claim 6, wherein the first though hole penetrates the circuit board along a first direction; the frame comprises a first end fixed to the circuit board, and a second end away from the first end along the first direction; a section area of the first end along a direction perpendicular with the first direction decreases from the first end towards the second end.

8. The vibration transducer as described in claim 7, wherein a first penetrating hole is provided on the fixed end penetrating thereon along the first direction; the first penetrating hole is configured to connect the first upper vibration cavity with the first upper connection hole and the inner cavity.

9. The vibration transducer as described in claim 8, wherein a second penetrating hole is provided on the frame penetrating thereon along the first direction; the second penetrating hole is configured to connect the first bottom vibration cavity with the first bottom connection hole and the back cavity.

10. The vibration transducer as described in claim 9, wherein the upper cover comprises an upper fixation portion fixed to the second end, a bottom fixation portion fixed to the circuit board, and a connection portion connecting the upper fixation portion and the bottom fixation portion; the connection portion is spaced apart from the first membrane along the first axis.

* * * * *